(12) United States Patent
Bhatt et al.

(10) Patent No.: US 9,253,038 B2
(45) Date of Patent: Feb. 2, 2016

(54) END-TO-END NETWORK ACCESS ANALYSIS

(75) Inventors: Sandeep N Bhatt, Madison, NJ (US); Prasad V Rao, Metuchen, NJ (US); Cat Okita, Toronto (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 1107 days.

(21) Appl. No.: 13/057,511

(22) PCT Filed: Aug. 4, 2009

(86) PCT No.: PCT/US2009/052635
§ 371 (c)(1),
(2), (4) Date: Feb. 4, 2011

(87) PCT Pub. No.: WO2010/017157
PCT Pub. Date: Feb. 11, 2010

(65) Prior Publication Data
US 2011/0142051 A1    Jun. 16, 2011

Related U.S. Application Data

(60) Provisional application No. 61/087,512, filed on Aug. 8, 2008.

(51) Int. Cl.
*H04L 12/28* (2006.01)
*H04L 12/24* (2006.01)
(Continued)

(52) U.S. Cl.
CPC ............ *H04L 41/0853* (2013.01); *H04L 45/02* (2013.01); *H04L 12/4641* (2013.01); *H04L 41/0893* (2013.01); *H04L 41/12* (2013.01); *H04L 45/00* (2013.01)

(58) Field of Classification Search
CPC ......... H04L 45/00; H04L 45/02; H04L 41/12; H04L 12/4641; H04L 41/0893
USPC ......... 370/238, 241, 250, 252, 254, 351, 392, 370/401, 400; 709/238, 249
See application file for complete search history.

(56) References Cited

U.S. PATENT DOCUMENTS 7,016,980 B1 *   3/2006   Mayer et al. ................. 709/249
8,218,445 B2 *   7/2012   Katz et al. .................... 370/238
(Continued)

FOREIGN PATENT DOCUMENTS

| CN | 1404268 A | 3/2003 |
| CN | 101114968 A | 1/2008 |
| EP | 1119151 A2 | 7/2001 |

OTHER PUBLICATIONS

Jungo, Dominik, et al., "A unit testing framework for network configurations," In Proceedings of 3rd International Workshop on Modelling, Simulation, Verification, and Validation of Enterprise Information Systems, Miami, FL USA, INSTICC Press, 2005. See Section 4.

(Continued)

*Primary Examiner* — Ajay Cattungal
(74) *Attorney, Agent, or Firm* — Hewlett-Packard Patent Department

(57) ABSTRACT

Instances of router models and filter models respectively are populated with configuration data from routers and filters in a network. A route advertising graph is derived from the router model instances. The route advertising graph indicates propagation of routes between the ones of the real-world devices serving as routers according to routing protocols implemented by the ones of the real-world devices serving as routers. Consolidated routing data is determined for the ones of the real-world devices serving as routers. In this process, the propagation of routes indicated by the route advertising graph is iterated to stability. For a destination node in the network, a respective route graph indicating available paths to the destination node from each source node in the network is constructed from the consolidated routing data. Services between each source node and the destination node are classified based on a full traversal of the route advertising graph.

16 Claims, 13 Drawing Sheets

(51) Int. Cl.
*H04L 12/751* (2013.01)
*H04L 12/701* (2013.01)
*H04L 12/46* (2006.01)

(56) References Cited

U.S. PATENT DOCUMENTS

| | | | | |
|---|---|---|---|---|
| 2005/0053009 | A1* | 3/2005 | Denby et al. | 370/250 |
| 2006/0268739 | A1* | 11/2006 | Garcia et al. | 370/254 |
| 2007/0211645 | A1* | 9/2007 | Tachibana et al. | 370/252 |
| 2007/0260746 | A1* | 11/2007 | Mirtorabi et al. | 709/238 |
| 2008/0025223 | A1* | 1/2008 | Karacali-Akyamac et al. | 370/241 |
| 2008/0062891 | A1* | 3/2008 | Van der Merwe et al. | 370/254 |
| 2008/0163207 | A1 | 7/2008 | Reumann et al. | |
| 2009/0028062 | A1* | 1/2009 | Meloche et al. | 370/252 |

OTHER PUBLICATIONS

Kantz, Stephen M., "Static Reachability Analysis and Validation Regarding Security Policies Implemented via Packet Filters," Thesis, Naval Postgraduate School, Mar. 2007.

Maltz, David A. et al., "Routing design in operational networks: a look from the inside," Proceedings of the 2004 conference on Applications, technologies, architectures, and protocols for computer communications, 2004, pp. 27-40.

The International Search Report and the Written Opinion of the International Searching Authority for International App No. PCT/US2009/052635 dated Feb. 26, 2010, pp. 12.

Xie, G.G. et al., "On static reachability analysis of IP networks," Proceedings of INFOCOM 2005, vol. 3, pp. 2170-2183, Publication Date: Mar. 13, 2005. See Sections 1-3 a.

Bandhakavi, S., et al., Analyzing end-to-end network reachability, Integrated Network Management, IM'09, IFIP/IEEE International Symposium on, IEEE, Jun. 2009, pp. 585-590.

Bandhakavi, S., et al., End-to End Network Access Analysis, XP-002736959, HP Labs, Nov. 21, 2008, pp. 1-22.

Burns, J., et al., Automatic Management of Network Security Policy, DARPA Information Survivability Conference; Exposition II, DISCEX'01, Proceedings, IEEE, vol. 2, 2001, pp. 12-26.

Extended European Search Report Mar. 23, 2015, EP Patent Application No. 09805412.5, 12 pages.

Guttman, J. D., et al., Rigorous Automated Network Security Management, International Journal of Information Security, 4.1-2, Feb. 2005, pp. 29-48.

Mayer, A., et al., Offline Firewall Analysis, International Journal of Information Security 5.3, Jun. 16, 2005, pp. 125-144.

Verma, P., et al., FACE: A Firewall Analysis and Configuration Engine, Applications and the Internet, 2005 Proceedings, The 2005 Symposium on, IEEE, 2005, pp. 74-81.

* cited by examiner 1. router → RouterID RouterInfo
2. routerID → string
3. routerInfo → connectedRoutingInfo staticRoutingInfo IGPRoutingInfo bgpRoutingInfo
4. connectedRoutingInfo → routeSpec* connected
5. routeSpec → networkSpec nextHopInfo weight
6. networkSpec → networkAddress wildcard-mask
7. nextHopInfo → nextHopAddress interface-group
8. nextHopAddress → IP address
9. interface-group → interface*
10. interface → interfaceID
11. interfaceID → string
12. staticRoutingInfo → routeSpec* static
13. IGPRoutingInfo → [ ospfRoutingInfo | IS-IS | ... ]
14. ospfRoutingInfo → ospfInitialRib
15. ospfInitialRib → ospfRibEntry*
16. ospfRibEntry → ospf-areas
17. ospf-areas → ospf-area*
18. ospf-area → routeSpec* ospf-areaID
19. bgpRoutingInfo → bgpInitialRib bgpAS-ID
20. bgpAS-ID → ASnumber bgpRouterID bgpRouterDescription
21. bgpInitialRib → bgpRibEntry*
22. bgpRibEntry → bgpNeighbors
23. bgpNeighbors → bgpNeighbor*
24. bgpNeighbor → routeSpec* bgpNeighborAS-ID
25. bgpNeighborAS-ID → bgpAS-ID Generic Router Grammar.

Figure 5

1. *firewall* → *firewallID firewallInfo*
2. *firewallID* → *string*
3. *firewallInfo* → *operationInfo routeInfo translationInfo policyInfo*
4. *operationInfo* → ( *translate,policy* | *policy,translate* )
5. *routeInfo* → *connectedRoutingInfo staticRoutingInfo*
6. *connectedRoutingInfo* → *routeSpec\* connected*
7. *routeSpec* → *networkSpec nextHopInfo weight*
8. *networkSpec* → *networkAddress wildcard-mask*
9. *nextHopInfo* → *nextHopAdddress interface-group*
10. *interface-group* → *interface\**
11. *interface* → *interfaceID*
12. *interfaceID* → *string*
13. *staticRoutingInfo* → *routeSpec\* static*
14. *translationInfo* → *translationType translateFrom translateTo*
15. *translationType* → ( *nat* | *ndr* | ... )
16. *translateFrom* → *ruleObject*
17. *translateTo* → *ruleObject*
18. *policyInfo* → *permission direction sourceInfo destinationInfo*
19. *permission* → ( *permit* | *deny* )
20. *sourceInfo* → *ruleObject\**
21. *destinationInfo* → *ruleObject\**
22. *ruleObject* → *networkSpec portSpec protoSpec*
23. *portSpect* → *port-range*
24. *port-range* → *ports*
25. *ports* → *port\**
26. *port* → *number*
27. *protoSpec* → ( *tcp* | *udp* | *ip* | *number*)

Generic Filter Grammar

Figure 6

| Generic Grammar | Device Specific Grammar | Configuration File | Value |
|---|---|---|---|
| router → RouterID RouterInfo | | | |
| routerID → string | routerID → hostname string | hostname SITEA_SW0 | routerID → SITEA_SW0 |
| routerInfo → connectedRoutingInfo staticRoutingInfo IGPRoutingInfo bgpRoutingInfo | | | |
| connectedRoutingInfo → routeSpec* connected | connected | | connected |
| routeSpec → networkSpec nextHopInfo weight | | | |
| networkSpec → networkAddress wildcard-mask | networkSpec → ip address IPaddress wildcard-mask | ip address 192.168.200.2 255.255.255.0 | networkSpec → 192.168.200.0/24 |
| nextHopInfo → nextHopAddress interface-group | | | |
| nextHopAddress → IPaddress | nextHopAddress → ip address IPaddress | ip address 192.168.200.2 255.255.255.0 | nextHopAddress → 192.168.200.2 |
| @percent interface-group → interface* interface → interfaceID interfaceID → string | interfaceID → interface string | Interface Vlan1300 | interfaceID → Vlan1300 |
| | | | connectedRoutingInfo → 192.168.200.0/24 192.168.200.2 Vlan1300 connected |

Figure 7

Figure 9 — Propagating Routes

END-TO-END NETWORK ACCESS ANALYSIS

CROSS-REFERENCE TO RELATED APPLICATIONS

This application claims priority to PCT Application PCT/US09/52635, filed Aug. 4, 2009 as a National Stage Entry that claims the benefit of the PCT application, and claims priority to U.S. Provisional Patent Application 61/087,512, filed Aug. 8, 2008, both of which are incorporated herein by reference in their entirety.

FIELD OF THE INVENTION

The present invention relates to a method and apparatus for carrying out end-to-end network access analysis based on configuration data.

BACKGROUND OF THE INVENTION

For any arbitrary pairing of source and destination across a computer network, whether the destination is reachable from the source depends on the states of the routing and filtering functional elements present in the network.

A routing functional element (herein generically referred to as a 'router') connects two or more logical subnets and serves to forward a packet received on one subnet to a destination on another subnet according to a locally-stored mapping between the packet final destination and the appropriate next subnet destination. The locally stored mapping (or 'route') is held in a routing table or routing information base, RIB (hereinafter, 'RIB' will be used generically to refer to the locally-stored mapping). The routes held in the RIB generally deal in groups of final destination addresses typically corresponding to one or more subnets. Where more than one route exists to a particular destination, the routes are generally given a preference weighting. If a destination is not in the RIB the router is unable to forward a packet intended for that destination. The RIB initially contains preset 'static' routes giving mappings to certain destinations; however, a router is also able to learn additional routes from its neighboring routers, this being achieved using one or more so-called 'routing protocols'. A routing protocol enables a router to advertise its routes to neighboring routers (subject to any policy restrictions) thereby enabling the latter to extend its own RIB. Routing protocols can be divided into two main types, namely:

Exterior Gateway Protocols, EGP, for exchanging routing information between routers in different autonomous systems, AS; an example is the BGP ('Border Gateway Protocol') which in practice is the predominant EGP.

Interior Gateway Protocols, IGP, for exchanging routing information between routers in the same routing domain (an AS may have one or several routing domains); an example is the OSPF ('Open Shortest Path First') protocol.

The operation of these routing protocols to extend the routes known to a router means that the contents of the router RIBs change dynamically whereby the fact that, at a particular point in time, a particular destination is not accessible from a particular source due to lack of routing information by one or more router, is no guarantee that the destination will remain unreachable.

A filtering functional element (herein generically referred to as a 'filter') serves to block/allow packets according to a set of rules typically expressed in terms of parameters such as the source/destination and/or the service specified in the packet (as used herein, 'service' means the combination of protocol and port number). A filter can be arranged to maintain context about active sessions ('state information'). In this case, if a packet does not match an existing connection, it will be evaluated according to a ruleset for new connections; however, if the packet matches an existing connection, it will be allowed to pass without further processing. This feature is sometimes referred to as "keep state".

From the foregoing description of routers and filters, it will be appreciated that there may be none, one or more paths through a network between a given pairing of source and destination for a given service and this may vary dynamically.

It should be noted that real-world devices embodying routing and filtering functionally (for example, switches and firewalls) may not necessarily be 'pure' in the sense of only incorporating one such functionality and not the other. For example, a switch may block certain services being sent out on a particular interface; in the present specification, such devices are considered as being a combination of the appropriate discrete routing and filtering functional elements. Where real-world devices are being referred to below, this will be stated explicitly; unqualified reference to a 'router' or 'filter' is, as already indicated, a reference to the corresponding functional element.

An example arrangement of routers and filters in a network is shown in FIG. 1 of the accompanying drawings. FIG. 1 shows a common network configuration for a managed service provider to provide data center space and management services for an enterprise customer with duplicate sites A and B (to provide redundancy and disaster recovery capabilities) interconnected on the customer side by primary and backup fiber links L1, L2. For each site, the network is broken into three parts—the customer compartment 10A/10B, an access compartment 11A/11B, which is shared between multiple customers, and a management and monitoring compartment 12A/12B (the compartments being interconnected by a VLAN L3).

For each site, the core of the customer installation 10A/10B is a pair of real-world layer-3 switches 13A/13B in a failover configuration. The switches 13A/13B are connected to the management and monitoring infrastructure of the service provider via a pair of real-world firewalls 14A/14B in an active/passive failover configuration.

Further real-world switches 16A/16B, 17A/17B, and 18A/18B are present in the customer access and management & monitoring compartments 11A/11B and 12A/12B. Further real-world firewalls 19A/19B are present in the customer access compartment 11A/11B.

Even in the relatively limited network of FIG. 1, errors in configuring the routers and filters can produce major problems and be difficult to track down. An example problem scenario for the FIG. 1 network is:

monitoring traffic from management host 200 is received at customer server 201 but response messages are not received back;

investigation shows that the monitoring traffic is reaching customer server 201 only via customer site B and the customer link L1 (that is, the traffic is coming via compartments 12B, 11B& 10B and not via 12A & 11A);

investigation also shows that the response messages from customer server 201 sent to switches 13A are being blocked at firewalls 14A.

it is found that the reason why the monitoring traffic from management host 200 reaches customer server 201 via customer site B is because the host 200 sends all its monitoring traffic through compartment 12B & 11B even if intended for customer site A;

the reason that the response messages are being blocked at the firewalls 14A is that these firewalls have the "keep state" feature and only allow through responses in respect of connections of which they already have a record—as the monitoring traffic for customer server 201 does not pass via the firewalls 14A, they have no record of a connection relevant to the response messages and so drop them.

The long-term solution to this asymmetric forward-return path problem is to have the monitoring traffic for site A sent via compartments 12A and 11A. However, for operational reasons, the quickest and most convenient way to implement a short term fix may well be to re-configure the customer server 200 to send its responses via customer site B rather than to re-configure the management host 200 that monitors multiple customer sites.

In a large enterprise network that is managed by geographically distributed teams of operations engineers, problems such as the above that result from mis-configuration of routers and filters can take anything from hours to weeks to diagnose and fix. Moreover, with hundreds or thousands of routers and filters, the potential interactions between configurations are numerous and the cost of manually determining all end-to-end flows is prohibitive.

It is therefore highly desirable to provide an efficient and reliable way of confirming that the routers and filters of a network are correctly configured to satisfy a set of end-to-end requirements (where an end-to-end access requirement is one specifying, for a given source-destination pair, which packet types must flow through and which must be denied).

Formally, an end-to-end access requirement is represented as:

<source, destination, service, permission, prioriy> where source and destination correspond to sets of IP_addresses, service contains the source and destination ports, and protocol, permission is either "allow" or "deny," and priority is a unique rank assigned to the requirement. A set of requirements is thus rank-ordered.

As already indicated, the routing information in the router RIBs is likely to provide for multiple paths between a source-destination pair. Now, certain packet types (specified by port and protocol) between the source and destination may be blocked by filter rules along some (or all) of these paths. For any packet, there are three outcomes: (i) all paths from source to destination are blocked, (ii) no path is blocked, or (iii) some paths are blocked while others are not.

However, an end-to-end access requirement implies that either every possible path must allow the packet to go through, or else no path must allow the packet to go through. In other words, satisfying an end-to-end requirement means that the third option (some paths permit the packet while others block it) must be ruled out even in the face of the dynamic nature of the routing information stored in the router RIBs. This type of deterministic behavior in networks is critical to the long term security and stability of the environment.

Experimentally determining whether a set of end-to-end requirements is met is not a practical proposition not only due to the scale of the task in any large network, but also because of the dynamic nature of the router RIBs.

As the configuration data (comprising filter rules, router connectivity and route advertisement policies) is generally readily available, it would be convenient to be able to determine from this data whether a given set of end-to-end access requirements is satisfied taking into account all potential paths from a source to a destination, over all possible states of the network RIBs.

The paper "On static reachability analysis of IP networks" (Geoffrey G. Xie, Jibin Zhan, David A. Maltz, Hui Zhang, Albert G. Greenberg, Gisli Hjálmýsson, and Jennifer Rexford. INFOCOM, pages 2170-2183. IEEE, 2005 describes an abstract framework to study the static reachability problem. The framework is based on the use of dynamic programming to compute all possible accesses, aggregated over all possible states.

SUMMARY OF THE INVENTION

In one aspect, the invention features a method in accordance with which instances of router models are populated with configuration data from real-world devices that serve as routers in a network and instances of filter models are populated with configuration data from real-world devices that serve as filters in the network. A route advertising graph is derived from the router model instances. The route advertising graph indicates propagation of routes between the ones of the real-world devices serving as routers according to routing protocols implemented by the ones of the real-world devices serving as routers. Consolidated routing data is determined for the ones of the real-world devices serving as routers. In this process, the propagation of routes indicated by the route advertising graph is iterated to stability. For a destination node in the network, a respective route graph indicating available paths to the destination node from each source node in the network is constructed from the consolidated routing data. Services between each source node and the destination node are classified based on a full traversal of the route advertising graph.

The present invention also envisages corresponding apparatus and computer readable media storing an program for implementing the above analysis method. Certain individual elements of the method also form inventions in their own right.

BRIEF DESCRIPTION OF THE DRAWINGS

Embodiments of the invention will now be described, by way of non-limiting example, with reference to the accompanying diagrammatic drawings of the prior art and of embodiments of the invention, in which:

FIG. 5 shows a generic router grammar used as a basis for generating a specific grammar customized to a particular router type, this customized grammar being thereafter used to fill out the FIG. 3 template for a specific router;

FIG. 6 shows a generic filter grammar used as a basis for generating a specific grammar customized to a particular filter type, this customized grammar being thereafter used to fill out the FIG. 4 template for a specific filter;

FIG. 7 shows an example of filling in the router template starting from the generic router grammar and the configuration file of a specific router;

DETAILED DESCRIPTION

Embodiments described herein provide an end-to-end access analysis method for a network in accordance with which instances of router and filter models are populated with configuration data from real-world devices that serve as routers and filters. The router model instances are used to derive a route advertising graph indicative of the propagation of routes between routers according to routing protocols run thereby. Consolidated routing data for the routers are determined by iterating to stability the propagation of routes in accordance with the route advertising graph. For a network destination of interest, a route graph indicative of available paths to the destination from at least one network source is derived based on the consolidated routing data of the routers. A full traversal of the route graph is carried out to classify services between the source and destination.

Preferably, route graphs are derived for all network destinations, with each route graph indicating available paths to the destination concerned from every network source.

Advantageously, each service is classified into one of types depending on whether:
  every source-destination path is open for the service;
  every source-destination path is blocked for the service by a filter in the path;
  some source-destination paths are open and others blocked for the service.

The embodiment of the network analysis method to be described below analyzes end-to-end network reachability by determining all possible end-to-end accesses from the static configuration data of network routers and filters (e.g., firewalls).

More particularly the method proceeds as follows. Starting with defined generic model templates for router and filter configurations, an instance of the appropriate template model is created for each router and filter functional element embodied by the real-world network devices of the network under consideration. Each such template instance is then populated with data drawn from the device configuration files. From the configuration parameters in the model instances, route graphs are constructed for the network that encode all possible paths between any two end points, taking into account routing policies. Once the route graphs have been constructed, the set of all end-to-end accesses is determined taking account of filter rules and this set is checked against the set of end-to-end requirements.

Figure 2:
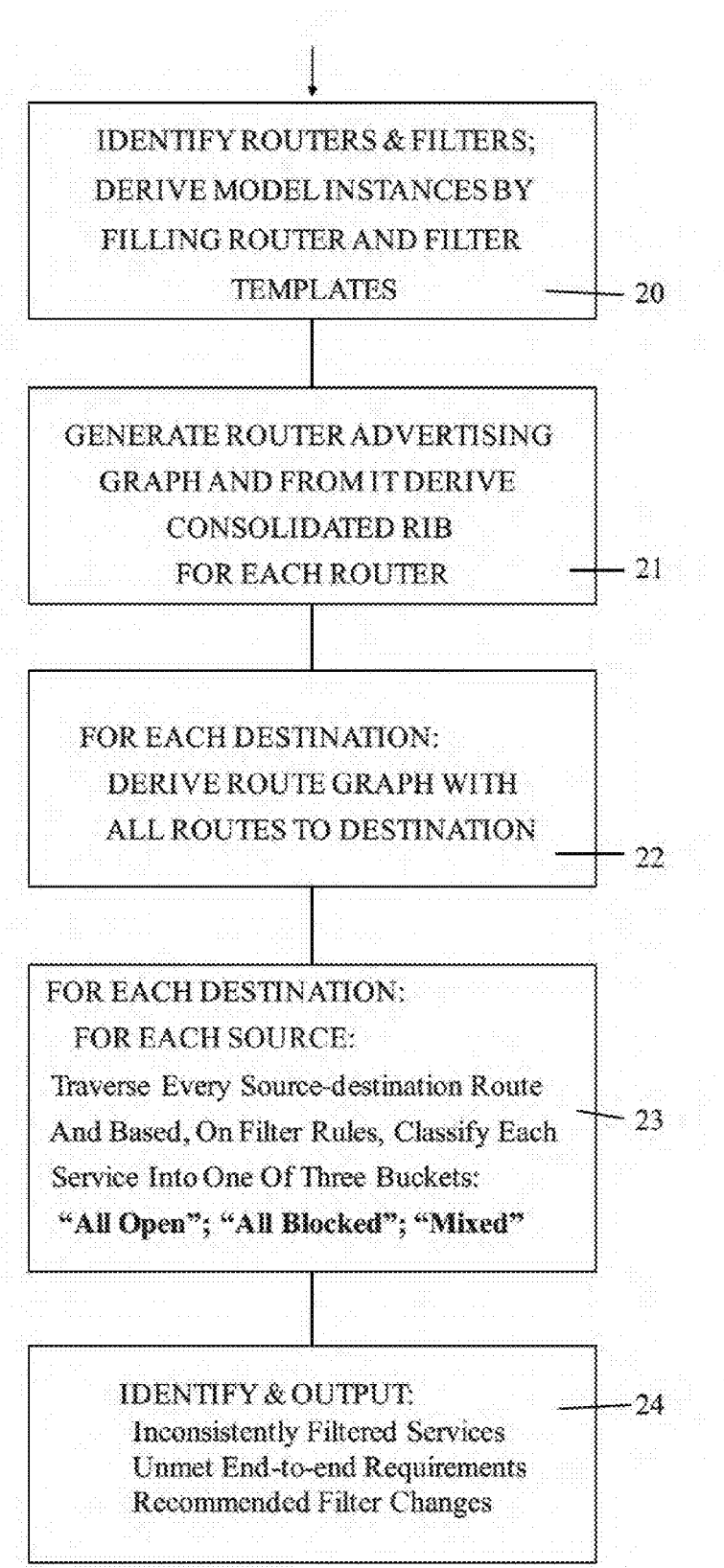
FIG. 2 is a diagram illustrating the main stages of an end-to-end network access analysis method embodying the invention.

FIG. 2 presents a five stage implementation of the end-to-end analysis method as follows:

Model Instantiation (block 20). For each router and firewall, create a model instance by populating the model instance with parameters from the configuration files.

Router RIB Consolidation (block 21). From the model instances, create a route advertisement graph. Each node of the graph represents a routing process. Edges in this graph are used to propagate the route advertisement entries between routers. The routes are consolidated into one Routing Information Base in each router model instance.

Route Graph Construction (block 22). Create Route graphs, one per destination. The nodes of each graph are routers, firewalls and subnets, and each destination route graph captures all possible paths to the destination from all sources.

Route Analysis (block 23). The route graphs are used to calculate all the end-to-end accesses for particular services.

End-to-end validation (block 24). Check the set of all end-to-end accesses for the services against the set of end-to-end requirements to find any violations, and suggest fixes wherever possible.

Each of the above stages of the analysis method is further described below.

Embodiments of the end-to-end analysis method are implemented by a data processing system, which may be implemented by one or more discrete modules (or data processing components) that are not limited to any particular hardware, firmware, or software configuration. The modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the end-to-end analysis method, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Embodiments of the data processing system typically include a processing unit, a system memory, and a system bus that couples the processing unit to the various components of the computer. The processing unit may include one or more processors, each of which may be in the form of any one of various commercially available processors. Generally, each processor receives instructions and data from a read-only memory and/or a random access memory. The system memory typically includes a read only memory (ROM) that stores a basic input/output system (BIOS) that contains start-up routines for the computer, and a random access memory (RAM). In some embodiments, the data processing system is implemented by a computer that additionally includes a hard drive, a floppy drive, and CD ROM drive that are connected to the system bus by respective interfaces. The hard drive, floppy drive, and CD ROM drive contain respective computer-readable media disks that provide non-volatile or persistent storage for data, data structures and computer-executable instructions. Other computer-readable storage devices (e.g., magnetic tape drives, flash memory devices, and digital video disks) also may be used with the computer. A user may interact (e.g., enter commands or data) with the computer using a keyboard, a pointing device, or other means of input. Information may be displayed to the user on a monitor or with other display technologies. In some embodiments, the computer also may consist of one or more graphics cards, each of which is capable of driving one or more display outputs that are synchronized to an internal or external clock source.

Figure 13:
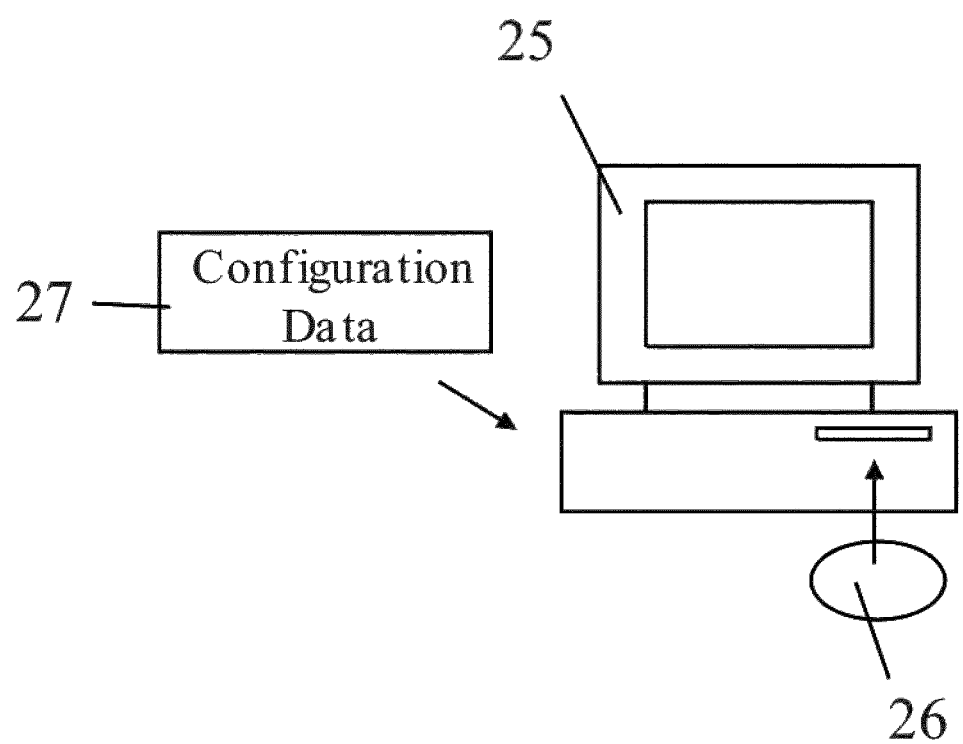
FIG. 13 is a diagram illustrating an embodiment of a data processing system that implements the end-to-end network access analysis method of FIG. 2.

Embodiments of the data processing system may be implemented in any one of a wide variety of electronic devices, including desktop and workstation computers. For example, in the exemplary embodiments illustrated in FIG. 13, the data processing system for implementing the end-to-end network analysis method is a program-controlled general purpose computer 25 running a corresponding analysis program (supplied, for example, stored on a computer readable medium 26 such as an optical data-storage disc). The computer 25 is also supplied with the configuration data 27 of the routers and filters of the network under analysis.

Model Instantiation (Block 20. FIG. 2)

This section presents the models for routers and firewalls. The models are generic templates and intended to support different vendor products and versions. Furthermore, each model represents the minimum information required to generate the reachability information required by the end-to-end access analysis method; thus, the models only include attributes that capture the routing policies and access control rules that concern this analysis. In the next section it is shown how to derive the information required by these generic models from real configurations.

As already indicated, the routing and filter functions of real-world network devices are handled separately with routing functions being modeled using a generic router model and filter functions being modeled using a generic filter model; thus, where a real-world router or switch device incorporates an ACL ('Access Control List'), the ACL is modeled separately from the routing functionality. This separation of router and filter models facilitates implementation; it would, however be possible to use models that mixed routing and filtering functions.

Router Model

Figure 3:
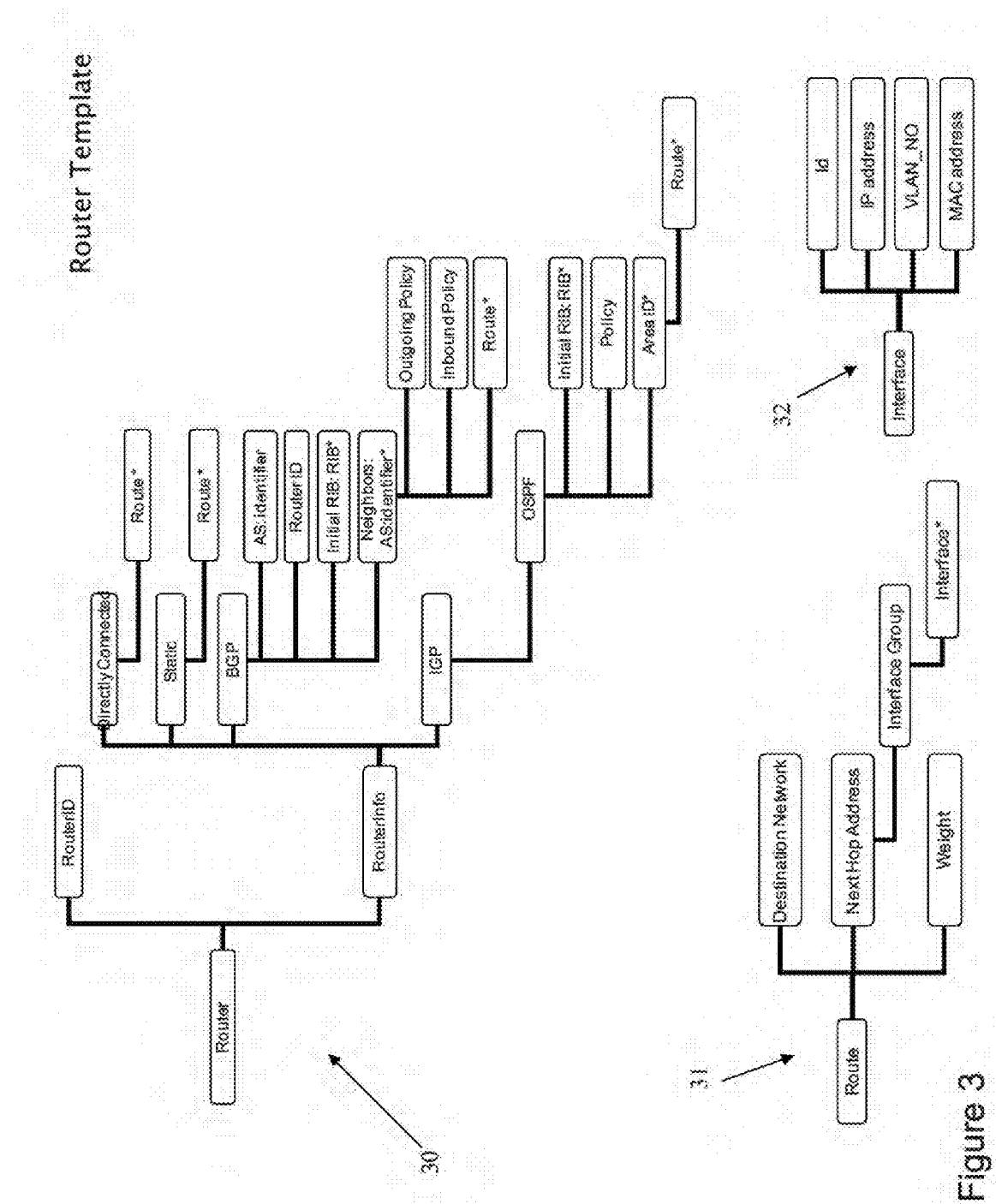
FIG. 3 is a diagram of a router template used in the analysis method of FIG. 2.

The generic router model shown in FIG. 3 allows the description, and later capture, of the vendor-independent information required about the routing functional element (router) of a real-world routing device. The generic router model comprises three components 30-32, namely 'Router', 'Route' and 'Interface'. The main component 30 is 'Router' the purpose of which is to capture the router identity and information about the routing protocols associated with the router. The 'Route' component 31 is for capturing parameters of each route known to a router, and the 'Interface' component 32 is for capturing information about the physical and virtual interfaces of the router.

Any given router will typically have a combination of directly connected networks, static routes and dynamically learned routes, such as routes learned via dynamic routing protocols such as RIP ('Routing Information Protocol', OSPF ('Open Shortest Path First') or BGP ('Border Gateway Protocol').

Further details about features of the FIG. 3 router model are given below.

Routes and the Route Component of the Model

A route is described by a 3-tuple <<destination network, next hop, weight>>, where destination network is the desired destination, next hop is the address to which packets must be sent in order to reach that network, and weight is a number which can be used to indicate route preference. This definition is common to all routing methods.

Directly Connected Routing

A router will be a member of multiple networks to which its interfaces are connected. Each of these networks is used to populate the field labeled "Directly Connected"

Static Routing

Static routes are fixed paths defined for a the router by its configuration data, rather than learned via a routing protocol. Since fixed routes are fragile in the face of network failure, static routes are typically used as a route of last resort, or to point to a shared virtual address in HSRP ('Hot Standby Router Protocol') and VRRP ('Virtual Router Redundancy Protocol') configurations.

Dynamic Routing and Route Models

Dynamic (or adaptive) routing protocols update the available network paths inside of an autonomous system and between ASes in real-time (or near real-time) based on changes that occur in the routing environment.

Briefly, there are three general types of algorithm used in dynamic routing:
1. Distance Vector (RIP, IGRP, EIGRP)
2. Link State
3. Path Vector The FIG. 3 model shows a node subtree for the External Gateway Protocol 'BGP', and a parent Internal Gateway Protocol (IRG) node from which node subtrees for particular IGPs depend (only one such protocol 'OSPF' is shown in FIG. 3 but the generic model actually includes node subtrees for multiple IGPs). Strictly speaking there should be a parent EGP node from which depend node subtrees for 'BGP' and other EGPs; however, since 'BGP' is used almost exclusively of other EGPs, it is possible to simplify the model as shown.

With regard to the "Neighbors" node subtree under the 'BGP' node, there is one such subtree for each associated neighbor AS.

Access Control List Models

As already noted, a real-world router may also specify access-control lists to control incoming and outgoing packets, and these could be represented in the router model by nodes for Router.Incoming Policy and Router.Outgoing Policy. However, it is here preferred to treat all filtering, whether done in a real-world firewall or router, as done in discrete filter functional elements. For routers with filters this can be represented as a combination of a router and a set of firewalls, one connected to each interface.

Filter Model

Figure 4:
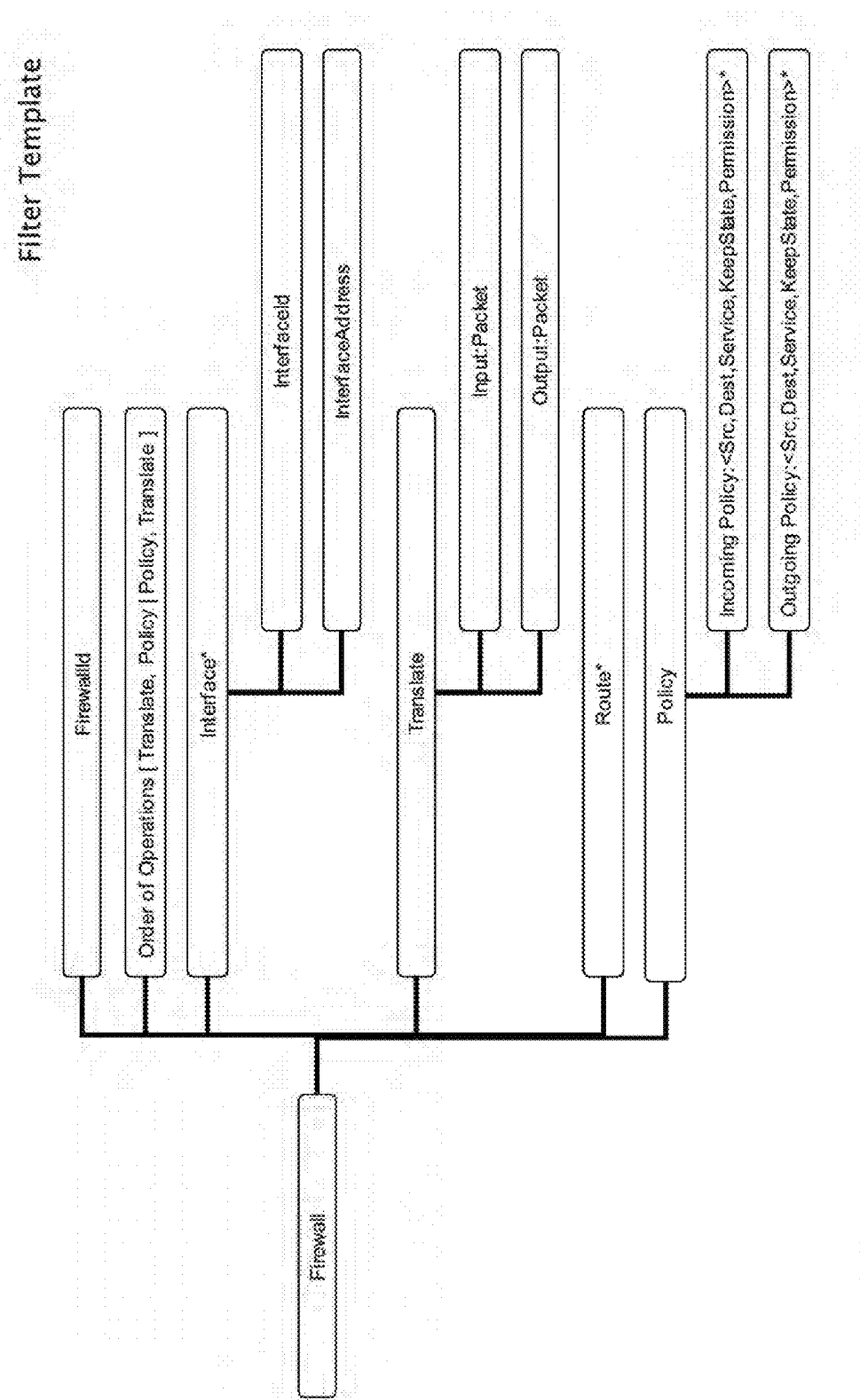
FIG. 4 is a diagram of a filter template used in the analysis method of FIG. 2.

The generic filter model shown in FIG. 4 allows us to describe and later capture the vendor-independent information about filters and ACLs required by the analysis method. In the FIG. 4 filter model, a filter consists of a set of interfaces, to which network address translations and policies to permit or deny access may be applied.

Further details of the FIG. 4 filter model are given below.

Interfaces

The filter interfaces are a set of all of the interface ids and IP addresses of the subnets physically connected to various interfaces of the filter.

Order of Operations

While the set of operations (route, translate, apply policy) performed by any type of real-world filters is fairly consistent, the order in which these operations are performed varies. For example, the firewall 'OpenBSD pf' uses <<Translate, Apply Policy, Route>> whereas Cisco IOS ACLs use <<Apply Policy, Route, Translate>> for traffic coming from the "inside" interface to the "outside"—but <<Apply Policy, Translate, Route>> for traffic coming from the "outside" interface to the "inside".

Routes and RIB

This is the set of static routes and directly connected routes known to the filter. As already indicated, real-world firewalls with dynamic routing are here represented as a combination of a filter and a set of routers, one connected to each interface.

Policy

Policy is what determines if a packet will be accepted or denied, and depending on the type of filter or access list, may be applied to packets as they are incoming, outgoing, or both.

1. IncomingPolicy consists of a set of all of the policies that are applied to traffic inbound through a particular interface. Each entry consists of the 4-tuple <Src,Dest,Port, Protocol>, and a boolean Keep State attribute (which is true if this rule was created as a result of an implicit "keep state" rule and it is false if the packet filter rule does not have keep state).

2. OutgoingPolicy consists of a set of all of the policies that are applied to traffic outgoing through a particular interface. Each entry consists of the 4-tuple <Src,Dest,Port, Protocol>, and a boolean Keep State attribute (which is true if this rule was created as a result of an implicit "keep state" rule and it is false if the packet filter rule does not have keep state).

Some types of real-world filter have implicit rules such as "packets are allowed to travel from higher security interfaces to lower security interfaces, but not vice versa", which means that the policy may need to be interpolated.

It should be noted that routing policy restrictions are clearly separate from the filter access controls. The former controls routing advertisements, whereas the latter are used to control network access.

Translation

Translation is an general description for mechanisms that modify the source, destination or ports described by firewall policies. Translation includes network address translation (NAT), port address translation (PAT) and redirection (RDR), which are briefly described here.

1. Network Address Translation consists of a set of translation rules which are applied as packets transit a given interface. NAT works as a function which takes certain source or destination addresses and converts them into other addresses.

2. Port Address Translation consists of a set of translation rules which take certain source or destination ports, and convert them into other ports.

3. Redirect (RDR) consists of a set of translation rules for destination addresses and/or ports.

The router and filter models described above can be represented using Java beans as classes with getter and setter methods. In this case, these models have:

1. A java constructor to create model nodes by invoking new with the classname.

2. Setter methods to assign values to fields in model nodes—object.setField(value).
   Values are either model nodes or scalar items such as integers and strings.

The configuration of a real-world device is a language that is subject to syntactic and semantic rules, contained in a grammar.

FIG. 5 is the generic router grammar, while FIG. 6 is the generic filter grammar. Each rule in a grammar has a left hand side and a right hand side separated by a →. Symbols in the typewriter font appear literally in the configuration file; we call these symbols keywords. Symbols that appear on the left hand side of a grammar are nonterminals. Others such as number are terminals. Throughout this section, this style of text is used to indicate a fragment of the actual configuration.

To capture a particular type of real-world router or firewall device, we first construct a specific grammar for the router/filter functionality of the device. A tool such as yacc or ANTLR is used to create an executable parser from this grammar, this parser being in the form of a parse tree that maps rules of the grammar to the contents of the configuration file. The leaves of the parse tree together are the contents of the configuration file. The interior nodes of the parse tree are instantiated versions of grammar rules. Next, the parser goes over the device configuration file, and applies device grammar rules appropriately to produce fragments of the populated model instance. At the completion of this traversal we have a completely populated model of the device, provided we started with a valid configuration file, and a correct grammar for the device. FIG. 7 illustrates, by way of example, a progression from the generic router grammar to Cisco IOS-specific router grammar which is then applied to particular configuration data.

A specific example is given below as to how a routing rule of the FIG. 3 router grammar is represented using the java class:

```
class NextHopInfo{
IpAddress nextHopInfo;
Vector<Inferface> interfaceGroup;
}
class Route{
IpAddress DestinationNetwork;
NextHopInfo NextHop;
Float weight;
}
```

Instances of the above model fragment are populated using the grammar rules:

```
RouteSpec → NetworkSpec NextHopInfo Weight;
NextHopInfo→ NextHopAddress InterfaceGroup;
```

(Note that in FIG. 7, the population of models is shown intuitively without resorting to lex and yacc conventions; in the present example, however, lex/yacc conventions are used for convenience).

Below, the rules above are annotated with actions to populate fields in the models using setter methods.

```
RouteSpec →
$$ = new Route( );
NetworkSpec
{ $$.setNetworkSpec($1); }
NextHopInfo
{ $$.setNextHopInfo($2); }
Weight
{ $$.setWeight($3); }
;
NextHopInfo→
{ $$ = new NextHopInfo( ); }
NextHopAddress
{ $$.setNextHopAddress($1); }
InterfaceGroup;
{ $$.setInterfaceGroup($2); }
```

The action new Route( ); creates a Route model instance, when the grammar rule for NetworkSpec is triggered. Then the destinationNetwork, nextHop and the weight fields are filled by calling the setter methods setNetworkSpec, setNextHopinfo and setWeight on this instance. The arguments for these methods are obtained by the recursive traversal of the parse tree.

Router Rib Consolidation (Block 21, FIG. 2)

In this analysis stage, a route advertisement graph (RAG) is constructed from a set of populated router and filter model instances. The RAG is then used to calculate the consolidated route information base (RIB) for each node in the RAG.

Route Advertisement Graph (RAG)

The route advertisement graph RAG, G(V,E) contains a node for each network region of each routing protocol run by a router $R_i$. that is, a node N for each:

Router. routing_protocol.network_region for example:

$R_i$.BGP.AS_identifier
$R_i$.OSPF.Area_ID

This is independent of the number of routing protocol sessions run; for example, there can be multiple OSPF sessions per Area_ID (represented by one node) as well as multiple OSPF sessions with different Area_IDs (represented by distinct nodes). For ease of reference, the term 'routing protocol process' (p) is used to cover all sessions (from one upwards) being run by a router in respect of the routing_protocol.network_region associated with a given node of the RAG.

The RAG also contains a respective node for the static route set $R_i$.Static of each router. The edge set E of the RAG consists of all edges $N_i \rightarrow N_j$ for which the routing protocol process $p_i$ associated with node $N_i$ advertises to the routing protocol process $p_j$ associated with node $N_j$.

Whether a routing protocol process advertises routes to another can be determined by the relevant protocol subtrees of the router models concerned. For instance, one of the conditions under which the BGP process of a router $R_x$ advertises routes to the BGP process of another router $R_y$ (using labels taken from FIG. 3) is:

if $R_y$.BGP ∈ $R_x$.BGP.neighbors and
($R_x$.BGP.AS ≠ $R_y$.BGP.AS) and
∃/ ∈ $R_x$.Interfaces, /' ∈ $R_y$.Interfaces : /.VLAN_NO = /'.VLAN_NO.

Figure 8:
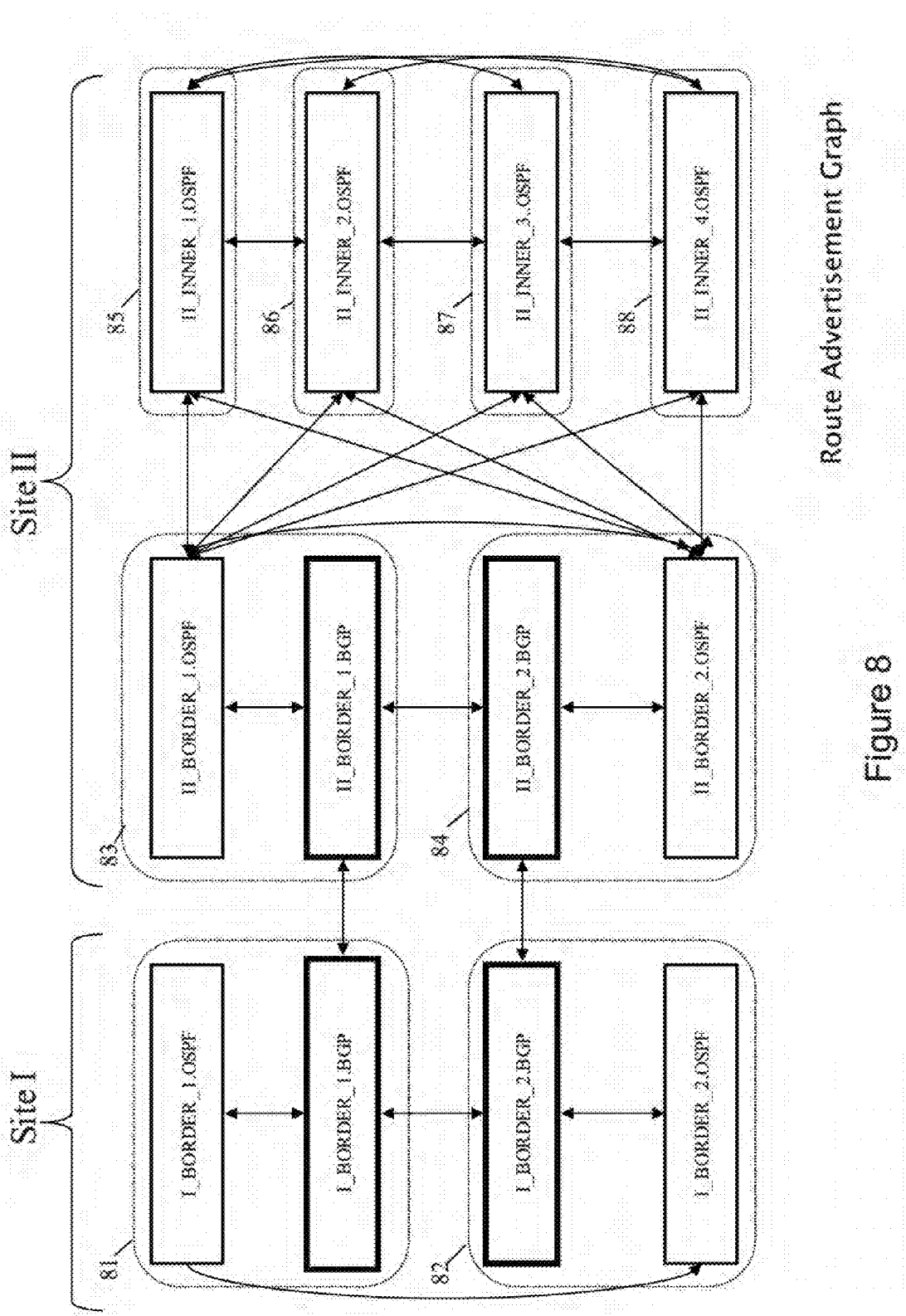
FIG. 8 is a diagram of part of an example route advertising graph such as generated in the course of the FIG. 2 method.

By way of example, FIG. 8 shows routers 81-88 (depicted in dotted outline) at two sites I and II (not related to the sites A & B of the FIG. 1 example); the routers at each site belong to the same AS, but the AS for site I is different from that of site II. At site I, there are two routers 82 and 83 both of which are border routers. At site II there are two border routers 83, 84 and four internal routers 85-88. The border routers 81-84 all run BGP. The routing protocol processes run by the routers are shown by full-line rectangular boxes (the EGP protocol process boxes having thicker perimeters); these boxes form the nodes of the RAG. Edges interconnect the protocol process boxes according to which process advertises to which. (Note that, for clarity, where two protocol processes advertise to each other, rather than showing two discrete edges which would be the correct visual representation of the two RAG edges concerned, FIG. 8 simply shows a double headed arrow).

Propagating the Routing Information

Once the RAG has been created, it is used to compute the set of routes available to each host. As described next, this involves propagating the information in each RIB throughout the network, and updating every RIB as it receives new route information. As this process is iterated, each RIB eventually converges to a fixed point; this final state determines all the network addresses to which the router can route traffic.

A standalone router can calculate its reachability information by looking at the local RIBs and the RIBs of all the routing processes. If there is a directed edge from RAG node $N_x$ to RAG node $N_y$, where nodes $N_x$, $N_y$ are associated with routing protocol processes $p_x$, $p_y$ run by routers $R_p$ and $R_q$ respectively, then in the absence of any access control policies, the routing protocol process $p_x$ sends the list of destinations it can reach to the routing protocol process $p_y$. This means that $R_q$ inherits routes to all the destinations reachable from $R_p$.

The router-specific outgoing policy of the routing protocol implemented by $p_x$ and the router-specific incoming policy of the routing protocol implemented by $p_y$ determine exactly which routes of $R_p$ can be propagated to $R_q$. Therefore, using the static information from the router's configuration, it is possible to update the set of destinations that can be reached from a particular router interface or through which the router can send a packet to a particular destination.

The following algorithm computes the fixed point values of the RIBs:

Algorithm for Route Propagation

```
1:   procedure RIBPropogate(RIBGraph)
2:     repeat
3:       for all (N_i→N_j) ∈ RIBGraph:Edge do
4:         for all routes ∈ p_i:RIB do
5:           if Policy allows advertising route then
6:             p_j:RIB:add(route)
7:           end if
8:         end for
9:       end for
10:    until RIB FixedPoint is reached
11:  end procedure
```

Testing for the RIB FixedPoint in algorithm line 10 is done by checking that the RIBs remain identical between successive iterations.

Figure 9:
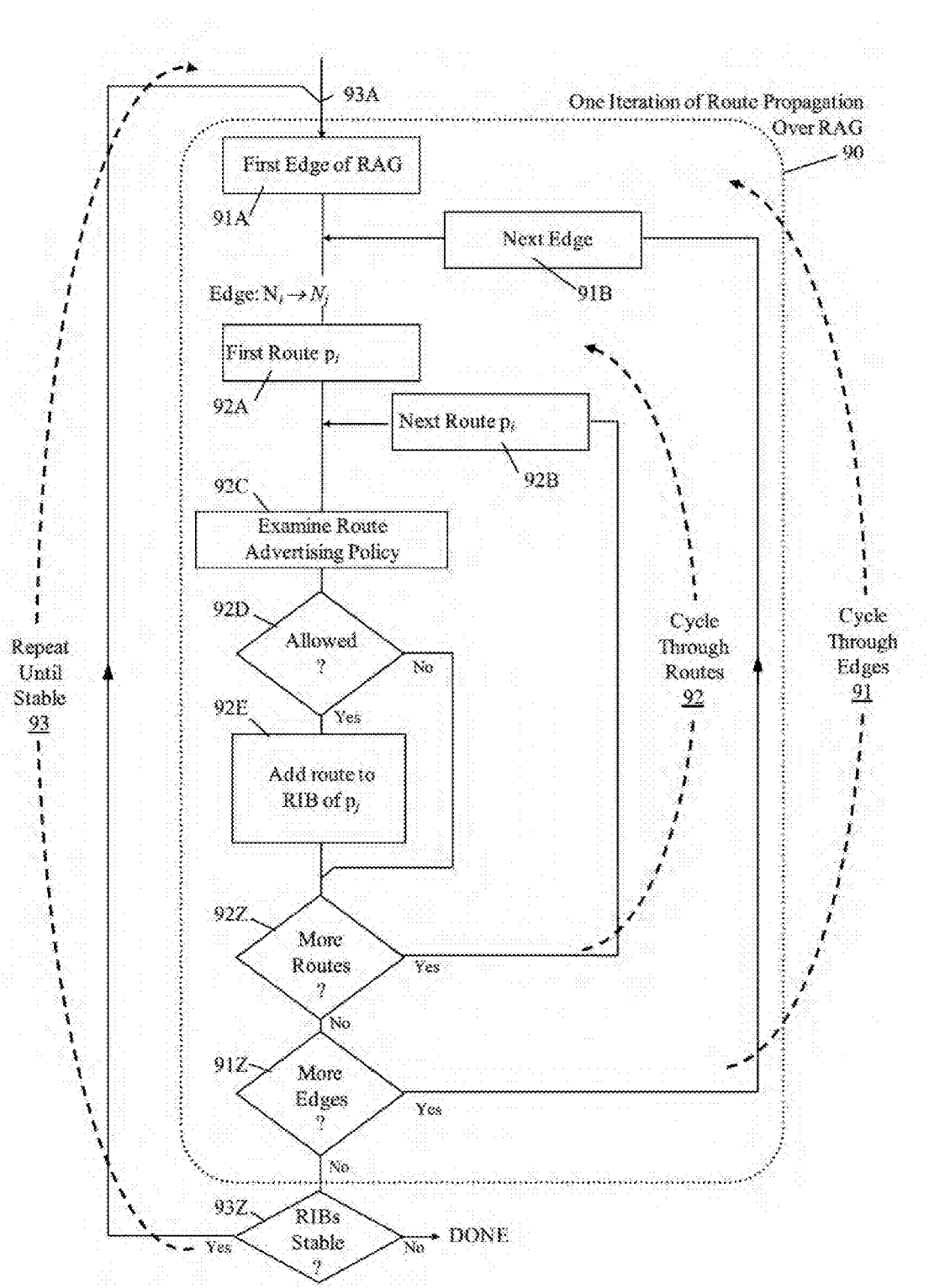
FIG. 9 is a flow chart representation of an algorithm for generating consolidated routing information bases in the course of the FIG. 2 method.

FIG. 9 is a flow chart style representation of the above algorithm. The algorithm steps iterated within the 'repeat . . . until' control structure are shown in FIG. 9 within the dotted rectangular box 90, the iteration loop being indicated by arrow 93 and the control structure by boxes 93A-Z with loop end test in box 93Z. The outer 'for all' control structure that causes the cycling through of all RAG edges is represented by boxes 91A-Z with the loop end test being box 91Z; arrow 91 indicates the cycle loop. The inner 'for all' control structure that causes the cycling through of all routes of a routing protocol process is represented by boxes 92A-Z with the loop end test being box 92Z; arrow 92 indicates this cycle loop. The addition of routes to a RIB is done in box 92E.

Upon reaching the fixed point, each router's consolidated RIB (R.RIB) is calculated as the union of RIBs of all the individual routing processes and the local RIB which also contains the static routes. At this point, each consolidated RIB contains the following information:

All the destinations reachable from the router, and
For each reachable destination IP in the RIB, the list of next-hop interfaces.

Route Graph Construction (Block 22).

A set of route graphs is next derived from the consolidated RIBs computed as the fixed point of the propagation algorithm. These route graphs are used in the following analysis stages 23, 24 to verify whether or not the network configurations satisfy the end-to-end access requirements.

A set of destination graphs is first produced, there being one destination graph, $G_d$, for each destination node d in the network. Each destination graph $G_d$ contains a node for each router, filter, subnet and VLAN. There is a directed edge from node x to node y if a packet destined for node d can possibly traverse the link from x to y based on the routing information in the consolidated router RIBs.

Figure 10:
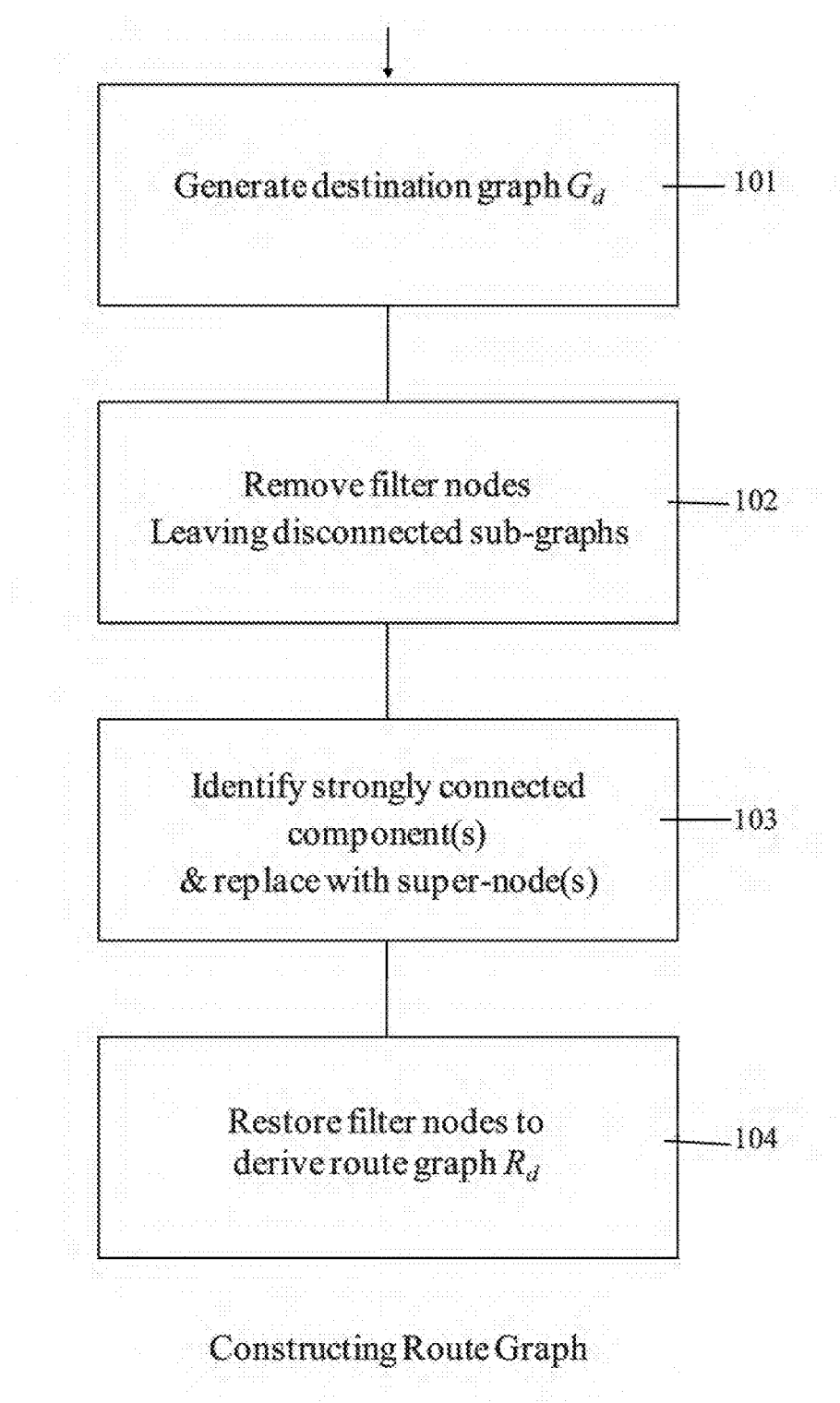
FIG. 10 is a diagram showing the main operations involved in generating, in the course of the FIG. 2 method, a route graph for a particular destination.

The process of deriving a route graph for destination node d starting with the production of the corresponding destination graph Gd is depicted in FIG. 10, box 101 representing the production of the destination graph.

Next, each graph $G_d$ is shrunk as follows:
1. First, all filter nodes are removed from $G_d$ (box 102) This splits the graph into a number of disconnected subgraphs.
2. Within each sub-graph, any group of strongly connected nodes (every node of the group directly connecting by a directed edge to every other group node) is identified (box 103) and replaced with a single "super-node," while maintaining the external incoming or outgoing edges for the node group.
3. Finally, the filters are re-inserted (box 104), making connections to the appropriate nodes/super-nodes. This residual graph is called the "route graph" $R_d$ for the destination d.

Note that each route graph $R_d$ contains within it all the possible paths along which a packet destined for d can travel from any source having regard to the routing information held by the router RIBs.

Figure 1:
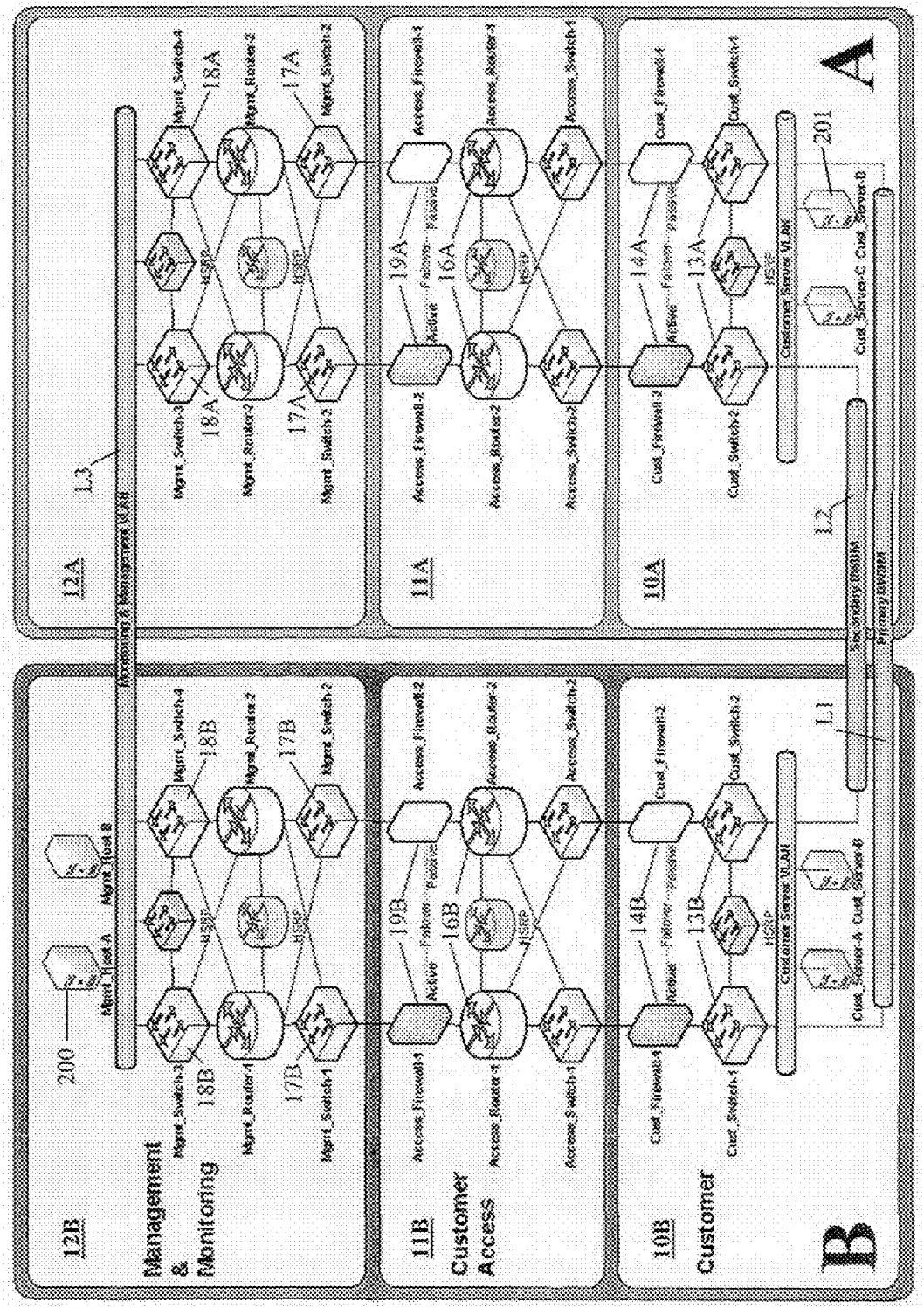
FIG. 1 is a diagram of an example known network configuration for managed services.
Figure 11:
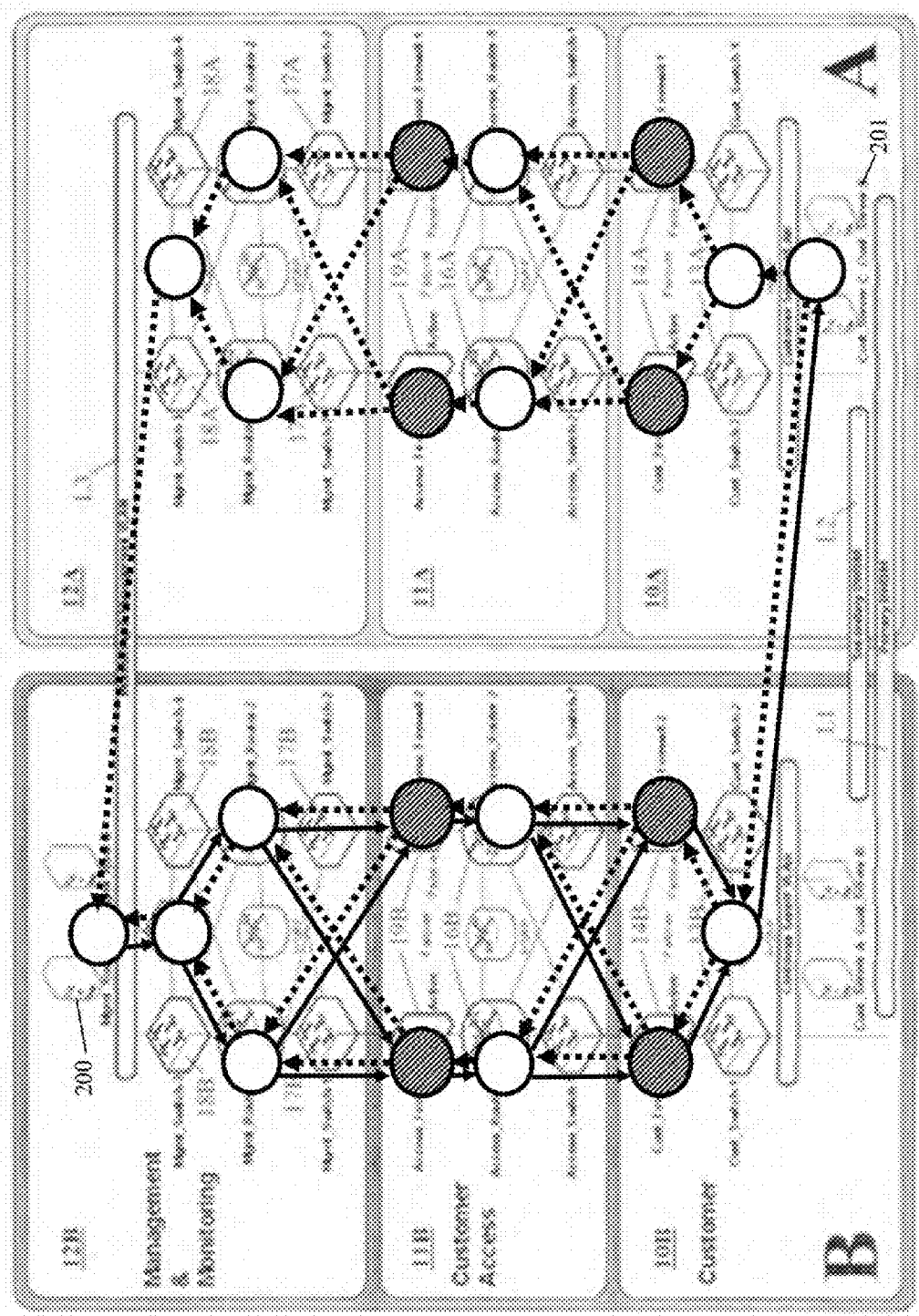
FIG. 11 is a diagram depicting for the FIG. 1 example network, two partial route graphs, this depiction being by way of the superposition of route-graph nodes on top of the network diagram of FIG. 1.

FIG. 11 shows partial route graphs for the nodes management host 200 and customer server 201 from the example of FIG. 1. The partial route graphs are shown overlaid on top of the FIG. 1 network representation. The nodes of the route graphs are shown as thick-walled circles with the filter nodes being hatched; the end point nodes for both graphs are the VLANs to which host 200 and server 201 are connected. The thick solid edges belong to the route graph for customer server 201, and the thick dotted edges belong to the route graph for management server 200. The route graphs are partial because they only show paths from one source to the destination subject of the route graphs and not paths from all sources—this was done for reasons of clarity. Note that even though the monitoring responses from server 201 to the hot 200 via the compartments 10A, 11A, 12A are blocked, this is due to the firewalls 14A rather than to any lack of routing information in the RIBs; accordingly the route graph for host 200 includes paths from server 201 to host 200 via compartments 10A, 11A, 12A (indeed connectionless traffic from server 201 to host 200 can pass this way as it is not blocked by the firewalls 14A).

Although global enterprises have large networks, with tens of thousands of elements, the number of firewalls is typically in the low hundreds for the largest networks and in the low tens for typical networks. The route graphs defined above are considerably smaller than the original networks; this facilitates searching over all possible source-destination paths in the next analysis stage.

Route Analysis (Block 23. FIG. 2).

From the route graphs $R_d$ for each destination, all end-to-end accesses that are consistent with the filters are computed in respect of services of interest (in particular, those services for which end-to-end access requirements have been specified).

Figure 12:
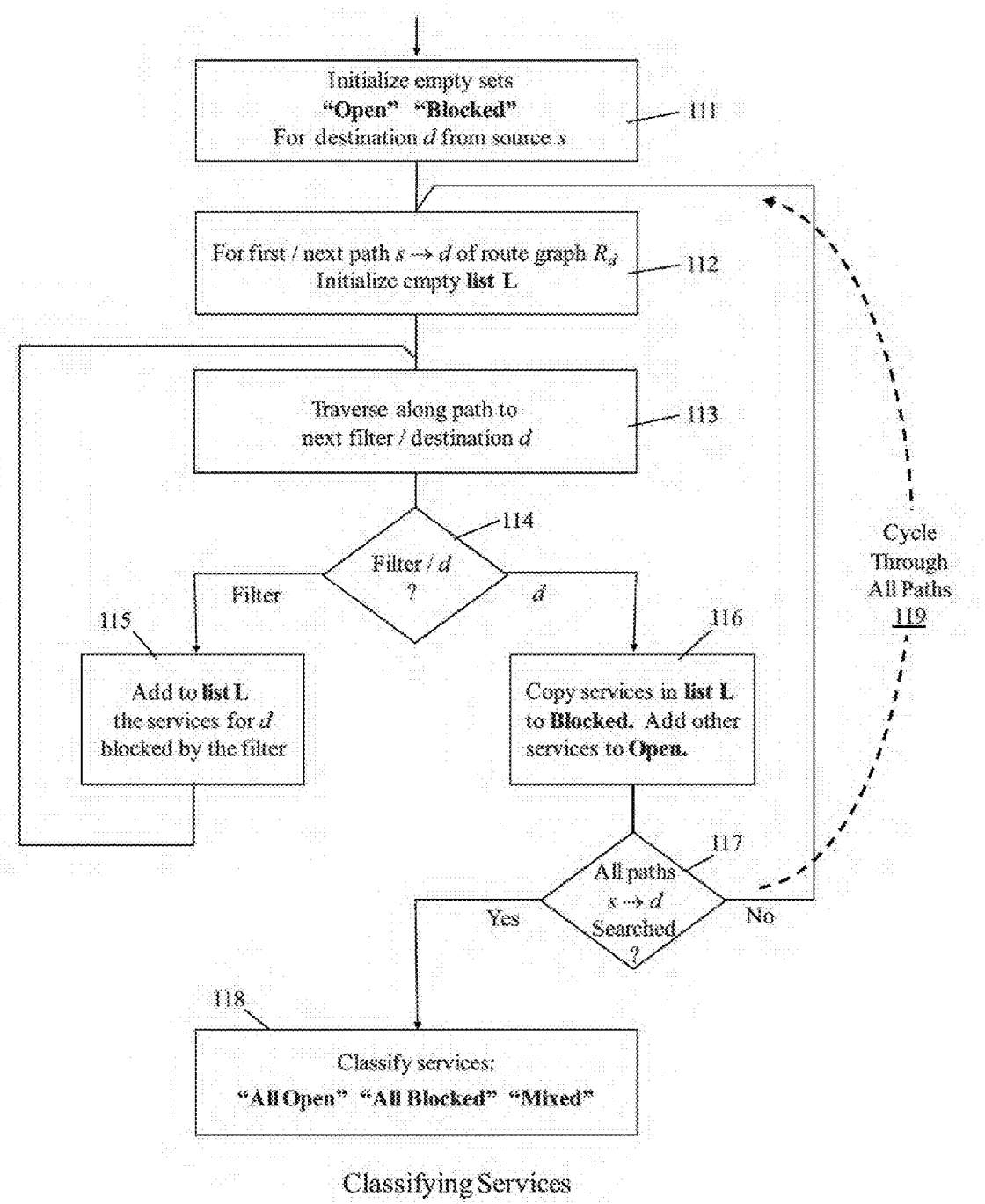
FIG. 12 is a flow chart illustrating the classification, in the course of the FIG. 2 method, of services for a given pairing of network source and destination based on the route graph derived for the destination.

A high-level overview of the algorithm used is presented below and is represented in flow chart form in FIG. 12; certain details have been omitted for the sake of clarity.

The algorithm takes as input a set of directed route graphs, one graph for each destination. Each firewall node is labeled with an associated rule set (subset of the original rule set containing only rules that match the destination node d).

For every source and destination pair (s,d) the algorithm classifies all services of interest (port, protocol) according to whether (a) every path from s to d is open (not blocked by a filter), (b) every path from s to d is blocked, or if (c) some s to d paths are open while others are blocked.

Algorithm for Classifying services between source s and destination d

Input: The route graph $R_d$ and a source node s.

Output: Each service (port, protocol) labeled according to whether all s to d paths are (i) blocked, (ii) open, or (iii) mixed—some paths are blocked while others are open.
1. Initialize empty sets Open and Blocked for node d (step 111 in FIG. 12).
2. Begin a search at the source s that exhaustively searches every path from s to d. A simple approach to doing this (and the one depicted in FIG. 12) involves traversing one-by-one every possible path from source s to destination d; in FIG. 12 this involves looping (see dashed arrow 119) through steps 112 to 117 with step 117 being a loop end test. The step carried out at each iteration are as follows:
   a. a list L is initialized empty (step 112)—the purpose of this list is to store the services that are blocked along the current path P to be traversed from the source s to the destination d.
   b. Traversal of the path P is then commenced/continued until either a filter is encountered or the destination d reached (tested for in step 114).
   c. When a filter is encountered, add the list of services that are blocked for d are added to list L (step 115). Path traversal is then continued (step 113)
   d. When the destination d is reached, the elements of L are inserted into the set Blocked maintained for node d (step 116). Similarly, the services of interest not in L are inserted into the set Open.

In practice, rather than each path being traversed individually (with implied a priori knowledge of the path), the paths from source to destination are discovered by a tree search type of algorithm employing back-tracking; at the same time a version of the list L is stored at each non-filter node encountered, this version reflecting the services blocked to that point along the path traversed to the node (there may be multiple list version stored for a node depending on the path used to reach the node); when back-tracking to the node, the version of the list appropriate to the path being followed is then picked up and taken to the next node. Implementation of such a traversal method is within the competence of one of ordinary skill in the art.

3. When all s-to-d paths have been traversed, label each service is labeled according to whether it appears in one or both sets Open, Blocked (step 118) as follows:
   service is labeled "All Open" if it only appears in the set Open;
   service is labeled "All Open" if it only appears in the set Blocked;
   service is labeled "Mixed" if it appears both in Open and Blocked.

One detail so far not addressed is that while nodes in the route graphs correspond to aggregates such as VLANs and subnets, filter rules may apply at a finer level of granularity, perhaps even to individual IP addresses. Such issues can be handled in a straightforward manner; for example, by refining each node into smaller sub-nodes depending on applicable rules across all filters.

Note that the running time of the algorithm is proportional to the number of source-destination paths, plus the time for bookkeeping operations to maintain the sets.

Although, in the worst case, the number of paths can be exponential in the size of the route graph, usually the route graph is substantially smaller than the original graph. Furthermore, production networks are structured so that the number of filters along any path, as well as the number of source-destination paths is severely limited. In practice, the algorithm will generally scale well for large enterprise networks.

Other approaches to classify the services "All Open", "All Blocked" and "Mixed" are possible that do not suffer from exponential worst case behavior. For example, by examining services (port, protocol pairs) one at a time, each iteration takes time linear in the size of the route graph, and the worst case time is proportional to the product of the graph size (number of nodes and edges), and the number services (ports, protocols pairs). In practice, the last two factors in the product make the running time on typical networks much worse than the algorithm given above.

End-to-End Validation (Block 24, FIG. 2).

Finally, having computed all the end-to-end accesses and classified the services in respect of each pairing of source and destination, it is a straightforward matter to verify if these are compliant with respect to a given set of end-to-end requirements.

Of course, even without this comparison with given end-to-end requirements, the output of the classification algorithm produces useful information, in particular by detecting service classified as "Mixed" as this classification indicates the potential for indeterminate network behavior in respect of the service due to incorrect configuration.

It is also possible to detect asymmetric routing (different forward and return paths) that can cause operational problems.

Round Trip Flows and Keep State Rules

The above discussion with respect to analysis of the route graphs (blocks 23, 24 of FIG. 2) considered only one-way flows and stateless firewalls. For round-trip flows (tcp, http, ftp, etc.) the situation is complicated by the presence of stateful filter rules, in particular "keep state" rules. In conjunction with asymmetric routes that are created unintentionally as a result of a misconfiguration, stateful rules make network problems difficult to debug.

To analyze round-trip flows, the following procedure can be used:
- starting with the route graphs $R_d$ and $R_s$, merge/concatenate the two graphs by identifying node d in the two graphs. In the concatenated graph, a path from s to d can be concatenated with a return path from d to s. The previously described classification algorithm can hen be used to find all the round-trip flows from s to d and back.

Now, some of the filters may contain "keep state" rules which work as follows. Suppose that, on the return path from d to s, a filter is encountered and the rule triggered permits the return packet, but is marked keep-state. Then, the packet is allowed through only if the forward path from s to d transited through the same filter; if not, the return packet is dropped. Generalizing, in order to satisfy an allow end-to-end requirement on a round-trip service, if even one return path passes through a firewall with a keep-state rule, every forward path must pass through that filter.

To account for the keep state rules, the classification method must be modified accordingly. Specifically, while exploring a round-trip path, if a "keep state" filter rule is encountered on the return path, then a check must be made to see if that filter was on the forward portion (from s to d) of the current path. If not, the service is blocked along that path.

Reconfiguring Filter Rules

If a given end-to-end access requirement is found not to be satisfied, it would be helpful to identify which real-world devices require configuration changes, and what changes need to be implemented.

A naive approach is to compute the fixes as the route graphs are traversed. In particular, for an 'allow' requirement, it is necessary to ensure that all filters along every s-d path will permit the packet through. During the traversal, we simply add the appropriate rule to every filter encountered. Similarly, for a 'deny' requirement, it is necessary to ensure that every, s-d path blocks the packet; this can be done, for example, by blocking filters that form an s-d cut set computed by a breadth-first search of the paths from s to d, and insert deny rules for the packet appropriately.

In general, it is not recommended that changes to firewall rule sets be made automatically. Rather, the rules generated above could be a starting point for an administrator responsible for refining the rule set. One weakness of the naive approach is that by adding rules for individual packets, it is possible to create very large, and therefore perhaps inefficient, rule sets.

It will be appreciated that many variants are possible to the above described embodiments of the invention.

With regard to the weights assigned to links in the configuration of routing policies, these weights can be used to estimate the likelihood of particular end-to-end paths, and to distinguish primary paths from secondary, backup paths.

It is possible to expand the notion of end-to-end access requirements beyond a simple Boolean choice. Since all source-destination paths are explicitly traversed, more general path properties can be tested for. For example, in the network of FIG. 1, a reasonable end-to-end policy might be that primary paths from the management and monitoring nodes to the customer servers must not traverse the customer-provisioned link. Such a policy can be evaluated using the above analysis method.

Individual elements of the preferred embodiment of the end-to-end network access analysis method and apparatus described above also embody discrete inventions that can be practiced independently of the overall analysis method and apparatus. In particular, such elements include:
- The generic router model.
- The generic filter model.
- The population of router and filter models by deriving a specific grammar for a given type of real-world router/filter device from a generic grammar, generating a parser from this specific grammar, and applying the parser to configuration data of a real-world device of the aforesaid type.
- The reduction of a destination graph showing all paths to a given destination by replacing any strongly connected component of the graph with a super-node.
- The checking for problems arising from the presence of filters with 'keep state' rules by analyzing round trip paths.
- In the case of an allow end-to-end requirement on a round-trip service, determining whether there is a return path including a filter with a 'keep state' rule, and if so, checking and/or ensuring that every forward path passes through that filter.

The traversal of all paths available between a source and destination as a result of the consolidated routing data of routers, to effect at least one of:
classification of services;
testing of general policy conditions;
generation of filter rules to satisfy a given end-to-end access requirement.

The individual features noted above, while preferred, are not to be taken as required features of the overall analysis method as generally they may be individually substituted or omitted.

Other embodiments are within the scope of the claims.

The invention claimed is:

1. A computer-implemented method, comprising:
populating instances of router models with configuration data from real-world devices that serve as routers in a network and populating instances of filter models with configuration data from real-world devices that serve as filters in the network;
deriving a route advertising graph from the router model instances, wherein the route advertising graph indicates propagation of routes between the ones of the real-world devices serving as routers according to routing protocols implemented by the ones of the real-world devices serving as routers;
determining consolidated routing data for the ones of the real-world devices serving as routers;
for a destination node in the network, constructing from the consolidated routing data a respective route graph indicating available paths to the destination node from each source node in the network; and
classifying services between each source node and the destination node based on a full traversal of the route graph,
wherein the constructing comprises
building for the destination node a destination graph that comprises a respective node for each of the real-world devices and a respective directed edge between each pair of the nodes in the destination graph that is traversable by a packet destined for the destination node,
removing from the destination graph all filter nodes corresponding to respective ones of the real-world devices serving as filters to produce a set of disconnected sub-graphs,
within each of the sub-graphs, replacing each strongly connected component with a respective supernode that has all external incoming and outgoing edges of the component, and
constructing the route graph by interconnecting the supernodes and non-replaced ones of the nodes in the sub-graphs with the filter nodes that were removed from the destination graph.

2. The method of claim 1, wherein the populating comprises, for each of the real-world devices serving as a router in the network, populating a respective one of the router model instances with a specification of one or more routing methods implemented by the real-world device in connection with respective interfaces of the real-world device.

3. The method of claim 1, wherein the populating comprises, for each of the real-world devices serving as a filter in the network, populating a respective one of the filter model instances with specifications of physical interface connections to the real-world device, network translations applied to the physical interface connections, and access policies applied to the physical interface connections.

4. The method of claim 1, wherein the deriving comprises building the route advertising graph that comprises a respective node for each routing process and static route set in the real-world devices that serve as routers in the network, and further comprises a respective edge between each pair of nodes in the route advertising graph in which one of the nodes of the pair advertises to the other node in the pair.

5. The method of claim 1, wherein the determining comprises:
for each node in the route advertising graph, ascertaining a consolidated route information base that specifies all destination nodes in the network that are reachable by the associated real-world devices serving as respective routers and that comprises a respective list of next-hop interfaces for each of the reachable destination nodes.

6. The method of claim 1, wherein the route graph comprises all paths that are traversable by a packet from any source node in the network to the destination node.

7. The method of claim 1, wherein the classifying comprises for each of the services:
classifying the service into a first class in response to a determination that every path in the route graph from the source node to the destination node is open for the service;
classifying the service into a second class in response to a determination that every path in the route graph from the source node to the destination node is blocked for the service; and
classifying the service into a third class in response to a determination that one or more paths in the route graph from the source node to the destination node are open for the service and one or more paths in the route graph from the source node to the destination node are blocked for the service.

8. The method of claim 7, wherein the classifying comprises:
traversing every path in the route graph from the source node to the destination node;
for each of the traversed paths, maintaining a respective list of the ones of the services that are blocked, wherein the maintaining comprises for each filter on the path, adding to the respective list all the services that are blocked for the destination node;
for each of the traversed paths, adding the ones of the services enumerated in the respective list to a blocked list and adding the ones of the services not enumerated in the respective list to an open list;
classifying into the first class each of the services that appears only in the open list;
classifying into the second class each of the services that appears only in the blocked list; and
classifying into the third class each of the services that appears in both the open list and the blocked list.

9. The method of claim 1, further comprising verifying that the classification of the services is compliant with one or more end-to-end requirements associated with the network.

10. The method of claim 1, wherein the network comprises a set of destination nodes, and further comprising performing the constructing and the classifying for all destination nodes in the network.

11. Apparatus, comprising: a non-transitory computer-readable medium storing computer-readable instructions; and
a processor coupled to the computer-readable medium, operable to execute the instructions, and based at least in part on the execution of the instructions operable to perform operations comprising populating instances of router models with configuration data from real-world devices that serve as routers in a network and populating instances of filter models with configuration data from real-world devices that serve as filters in the network;

deriving a route advertising graph from the router model instances, wherein the route advertising graph indicates propagation of routes between the ones of the real-world devices serving as routers according to routing protocols implemented by the ones of the real-world devices serving as routers;

determining consolidated routing data for the ones of the real-world devices serving as routers;

for a destination node in the network, constructing from the consolidated routing data a respective route graph indicating available paths to the destination node from at least one source node in the network; and classifying services between the source node and the destination node based on a full traversal of the route graph, wherein in the classifying, the processor is operable to perform operations comprising, for each of the services:

classifying the service into a first class in response to a determination that every path in the route graph from the source node to the destination node is open for the service;

classifying the service into a second class in response to a determination that every path in the route graph from the source node to the destination node is blocked for the service; and classifying the service into a third class in response to a determination that one or more paths in the route graph from the source node to the destination node are open for the service and one or more paths in the route graph from the source node to the destination node are blocked for the service.

12. The apparatus of claim 11, wherein in the populating the processor is operable to perform operations comprising:

for each of the real-world devices serving as a router in the network, populating a respective one of the router model instances with a specification of one or more routing methods implemented by the real-world device in connection with respective interfaces of the real-world device; and for each of the real-world devices serving as a filter in the network, populating a respective one of the filter model instances with specifications of physical interface connections to the real-world device, network translations applied to the physical interface connections, and access policies applied to the physical interface connections.

13. The apparatus of claim 11, wherein the network comprises a set of destination nodes, and the processor is operable to perform operations comprising performing the constructing and the classifying for all destination nodes in the network.

14. At least one non-transitory computer-readable medium having computer-readable program code embodied therein, the computer-readable program code adapted to be executed by a computer to implement a method comprising:

populating instances of router models with configuration data from real-world devices that serve as routers in a network and populating instances of filter models with configuration data from real-world devices that serve as filters in the network;

deriving a route advertising graph from the router model instances, wherein the route advertising graph indicates propagation of routes between the ones of the real-world devices serving as routers according to routing protocols implemented by the ones of the real-world devices serving as routers;

determining consolidated routing data for the ones of the real-world devices serving as routers;

for a destination node in the network, constructing from the consolidated routing data a respective route graph indicating available paths to the destination node from each source node in the network; and classifying services between each source node and the destination node based on a full traversal of the route graph, wherein the classifying comprises, for each of the services:

classifying the service into a first class in response to a determination that every path in the route graph from the source node to the destination node is open for the service;

classifying the service into a second class in response to a determination that every path in the route graph from the source node to the destination node is blocked for the service; and classifying the service into a third class in response to a determination that one or more paths in the route graph from the source node to the destination node are open for the service and one or more paths in the route graph from the source node to the destination node are blocked for the service.

15. The at least one non-transitory computer-readable medium of claim 14, wherein the populating comprises:

for each of the real-world devices serving as a router in the network, populating a respective one of the router model instances with a specification of one or more routing methods implemented by the real-world device in connection with respective interfaces of the real-world device; and for each of the real-world devices serving as a filter in the network, populating a respective one of the filter model instances with specifications of physical interface connections to the real-world device, network translations applied to the physical interface connections, and access policies applied to the physical interface connections.

16. The at least one non-transitory computer-readable medium of claim 14, wherein the network comprises a set of destination nodes, and the method comprises performing the constructing and the classifying for all destination nodes in the network.

* * * * *